(12) United States Patent
Chiang et al.

(10) Patent No.: US 6,674,447 B1
(45) Date of Patent: Jan. 6, 2004

(54) METHOD AND APPARATUS FOR AUTOMATICALLY RECORDING SNAPSHOTS OF A COMPUTER SCREEN DURING A COMPUTER SESSION FOR LATER PLAYBACK

(75) Inventors: Hui-Hwa Chiang, Fremont, CA (US); Kuo-Chun Lee, Fremont, CA (US); Tsung-Yen (Eric) Chen, Fremont, CA (US); Ching-Chih (Jason) Han, Fremont, CA (US)

(73) Assignee: Oridus, Inc., Fremont, CA (US)

( * ) Notice: Subject to any disclaimer, the term of this patent is extended or adjusted under 35 U.S.C. 154(b) by 0 days.

(21) Appl. No.: 09/455,039

(22) Filed: Dec. 6, 1999

(51) Int. Cl.[7] .............................................. G06F 17/30
(52) U.S. Cl. ...................................... 345/704; 345/531
(58) Field of Search ................................. 345/719–726, 345/867, 804, 802, 808, 806–807, 741–743, 769–771, 704, 765–768, 531, 545, 534, 535, 537, 538, 543, 546–547; 707/203, 204; 711/1–6, 162, 110–112, 114, 200–203

(56) References Cited

U.S. PATENT DOCUMENTS

| | | | | |
|---|---|---|---|---|
| 5,673,205 A | * | 9/1997 | Brunson ...................... 364/514 |
| 5,710,918 A | | 1/1998 | Lagarde et al. ............. 395/610 |
| 5,758,174 A | * | 5/1998 | Crump et al. ................ 395/750 |
| 5,793,964 A | | 8/1998 | Rogers et al. .......... 395/200.32 |
| 5,815,683 A | | 9/1998 | Vogler ......................... 395/500 |
| 5,838,906 A | | 11/1998 | Doyle et al. ............ 395/200.32 |
| 5,850,517 A | | 12/1998 | Verkler et al. ......... 395/200.32 |
| 5,852,474 A | * | 12/1998 | Nakagaki et al. ............ 348/564 |
| 5,861,883 A | | 1/1999 | Cuomo et al. ............... 345/326 |
| 5,905,988 A | * | 5/1999 | Schwartz et al. ............ 707/104 |
| 5,920,865 A | | 7/1999 | Ariga ........................... 707/10 |
| 5,925,103 A | | 7/1999 | Magallanes et al. ........ 709/230 |
| 5,928,324 A | | 7/1999 | Sloan .......................... 709/203 |
| 5,944,784 A | | 8/1999 | Simonoff et al. ............ 709/203 |
| 5,991,796 A | | 11/1999 | Anupam et al. ............. 709/206 |
| 6,038,639 A | * | 3/2000 | O'Brien et al. .............. 711/114 |
| 6,085,298 A | * | 7/2000 | Ohran .......................... 711/162 |
| 6,157,410 A | * | 12/2000 | Izumi et al. ................. 348/495 |
| 6,185,439 B1 | * | 2/2001 | Guerrero et al. ............ 455/560 |
| 6,205,450 B1 | * | 3/2001 | Kanome ...................... 707/203 |
| 6,211,974 B1 | * | 4/2001 | Haneda ........................ 358/527 |
| 6,243,171 B1 | * | 6/2001 | Haneda ....................... 358/1.15 |
| 6,295,086 B1 | * | 9/2001 | Fukushima et al. ......... 348/201 |
| 6,397,256 B1 | * | 5/2002 | Chan et al. .................. 709/229 |

* cited by examiner

Primary Examiner—Steven Sax
(74) Attorney, Agent, or Firm—Victor H. Okumoto

(57) ABSTRACT

A method for automatically recording snapshots of a computer screen during a computer session for later playback, comprises receiving a start indication, and automatically recording snapshots of a computer screen periodically during the computer session after the start indication is reached. An apparatus for performing such function comprises a frame buffer for storing snapshots of the computer screen, a FIFO cache memory, a mass storage memory, and programmed means. The programmed means receives a start indication, periodically copies data from the frame buffer to the FIFO cache memory during a computer session after the start indication is reached, and compresses the stored data before storing it the mass storage memory for later playback.

20 Claims, 5 Drawing Sheets

US 6,674,447 B1

METHOD AND APPARATUS FOR AUTOMATICALLY RECORDING SNAPSHOTS OF A COMPUTER SCREEN DURING A COMPUTER SESSION FOR LATER PLAYBACK

FIELD OF THE INVENTION

The present invention generally relates to techniques for recording user activities during a computer session and in particular, to a method and apparatus for recording snapshots of a computer screen during a computer session for later playback.

BACKGROUND OF THE INVENTION

For archival and other purposes, it is desirable to record user activities during a computer session for later playback. One way of doing this is to periodically save temporary work files during an application session. Another way is to maintain a history log during an Internet session.

Neither technique, however, records snapshots of a computer screen during a computer session for later playback. The playback of snapshots of the computer screen is useful in an application session, for example, to give a quick visual impression of the progress of an application as it evolves. It is also useful, for example, to provide a quick review by parents of images being viewed by their children during an unsupervised internet session at home, or a quick review by employers of images being viewed by their employees during an unauthorized internet session at work. In these latter examples, it would also be useful for such recording of snapshots of the computer screen to be transparent to the computer user so as to be useful for surveillance purposes.

OBJECTS AND SUMMARY OF THE INVENTION

Accordingly, it is an object of the present invention to provide a method and apparatus for automatically recording snapshots of a computer screen during a computer session for later playback.

Another object is to provide such a method and apparatus in a transparent manner to the computer user so as to be useful for surveillance purposes.

Yet another object is to provide such a method and apparatus while minimizing necessary memory required for accomplishing same.

These and additional objects are accomplished by the various aspects of the present invention, wherein briefly stated, one aspect of the invention is a method for automatically recording snapshots of a computer screen during a computer session for later playback, comprising: receiving a start indication; and automatically recording snapshots of a computer screen periodically during a computer session after said start indication is reached.

In another aspect of the invention, an apparatus for automatically recording snapshots of a computer screen during a computer session for later playback, comprises: a frame buffer for storing snapshots of the computer screen; a memory; and programmed means for receiving a start indication and storing data in said memory derived from contents of said frame buffer periodically during a computer session after said start indication is reached.

In yet another aspect of the invention, a computer system for automatically recording snapshots of a computer screen during a computer session for later playback, comprises: a frame buffer for storing snapshots of the computer screen; a memory; and programmed means for receiving a start indication, storing data in said memory derived from contents of said frame buffer periodically during a computer session after said start indication is reached, and retrieving said stored data from memory for playback upon command.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

As used herein, the following terms in parentheses shall have the following meanings to be interpreted consistent with their usage in this specification including claims:

"Snapshot" shall mean pixel data information, in any form, for a computer screen at a given time.

"Time Stamp" shall mean a time and date, as kept track by a computer, corresponding to and indicating when a snapshot was taken of the computer's screen.

"Recording" shall mean the storing of snapshots at determined intervals in computer memory.

"Playback" shall mean the replaying of computer screens from recorded snapshots retrieved from computer memory.

"Computer Session" shall mean a period of time when a computer user is causing images or data to be displayed on a computer screen.

Figure 1:
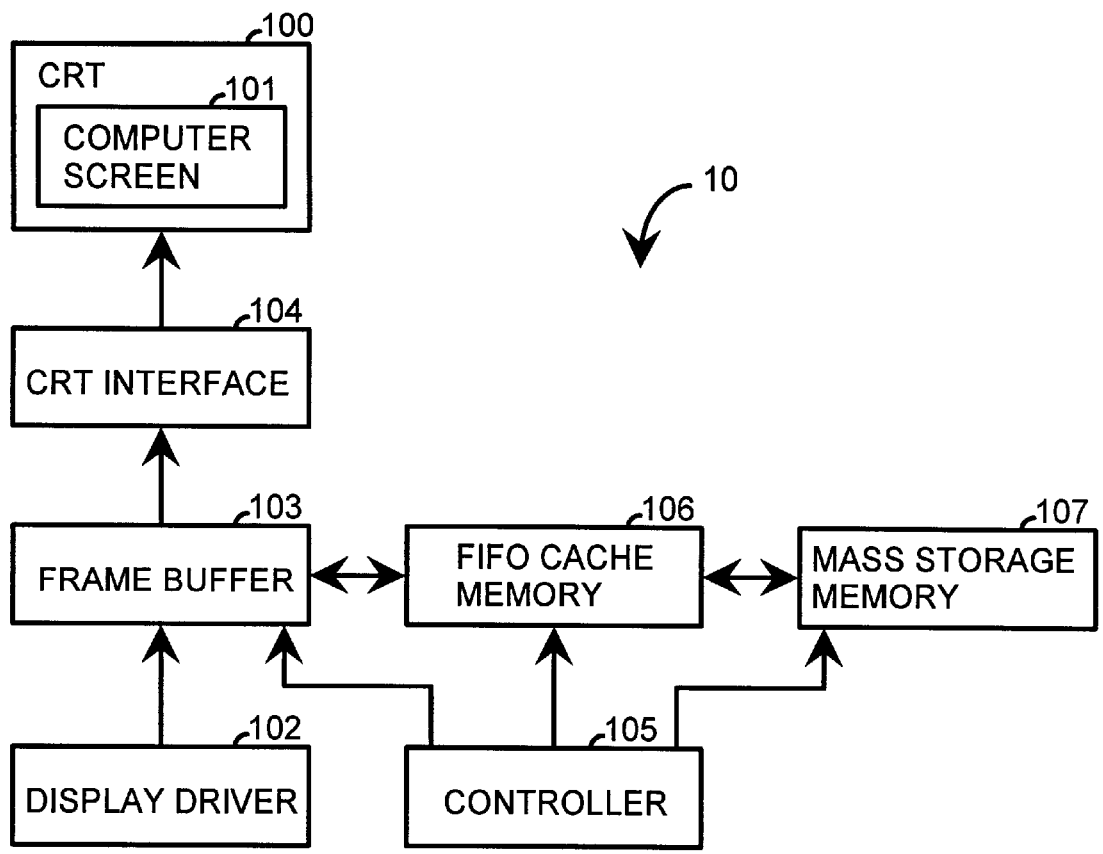
FIG. 1 illustrates a block diagram of a computer system including an apparatus for automatically recording snapshots of a computer screen during a computer session for later playback, utilizing aspects of the present invention.

FIG. 1 illustrates a block diagram of a computer system 10 for automatically recording snapshots of a computer screen 101 of a cathode-ray tube (CRT) or monitor 100 during a computer session on the computer system 10 for later playback. The computer screen 101 is conventionally driven by a display driver 102 storing data for each pixel of the computer screen 101 in a frame buffer 103, and a CRT interface 104 retrieving the data from the frame buffer 103 and converting it into an RGB signal to drive the computer screen 101.

An apparatus for automatically recording snapshots of the computer screen 101 during a computer session on the computer system 10 for later playback includes the frame buffer 103, a controller 105, a FIFO cache memory 106, and a mass storage memory 107. The frame buffer 103 operates in its conventional mode to store pixel data information for the computer screen. The controller 105 is a combination of hardware and software that serves as a programmed means for receiving a start indication and storing data in the FIFO cache memory 106 and the mass storage memory 107 during a computer session after the start indication is reached. The start indication may be a user specified start time, or a programmed interrupt. The FIFO cache memory 106 has much faster read/write access times and much less storage capacity than the mass storage memory 107.

A primary function of the controller 105 is to control the flow of data or information between the frame buffer 103, the FIFO cache memory 106 and the mass storage memory 107. In the recording mode, the controller 105 copies or stores snapshots from the frame buffer 103 into locations in the FIFO cache memory 106 at determined time intervals between start and stop indications during a computer session. Substantially concurrent with such copying or storing, the controller 105 reads the contents from another location of the FIFO cache memory 106, in which, a previous snapshot had been stored, and processes it through a compression algorithm, then stores the compressed data into the mass storage memory 107.

Figure 2:
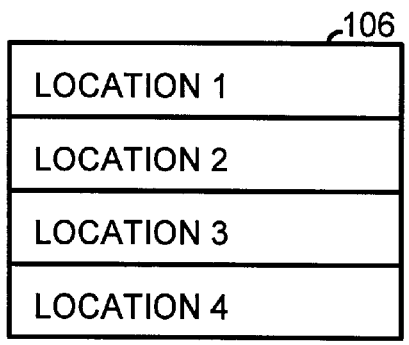
FIG. 2 illustrates a FIFO cache memory structure useful for an apparatus for automatically recording snapshots of a computer screen during a computer session for later playback, utilizing aspects of the present invention.

For example, FIG. 2 illustrates a FIFO cache memory 106 having four storage locations, each for storing one snapshot of the computer screen. Conventional FIFO memory pointers are used to keep track of the next location available to be written to, and the next location having stored contents to be read from. Assuming the write pointer is pointing to location 4 (i.e., locations 1, 2 and 3 have already been written to), and the read pointer is pointing to location 2 (i.e., location 1 has already been read from), then the next snapshot read from the frame buffer 103 will be stored in location 4, advancing the write pointer to point to location 1, and the next snapshot to be compressed will be read from location 2, advancing the read pointer to location 3. By using a dual-port RAM for the FIFO cache memory 106, such writing and reading activities can occur substantially concurrently.

Other functions performed by the controller 105 are described in conjunction with FIGS. 3–7.

Figure 3:
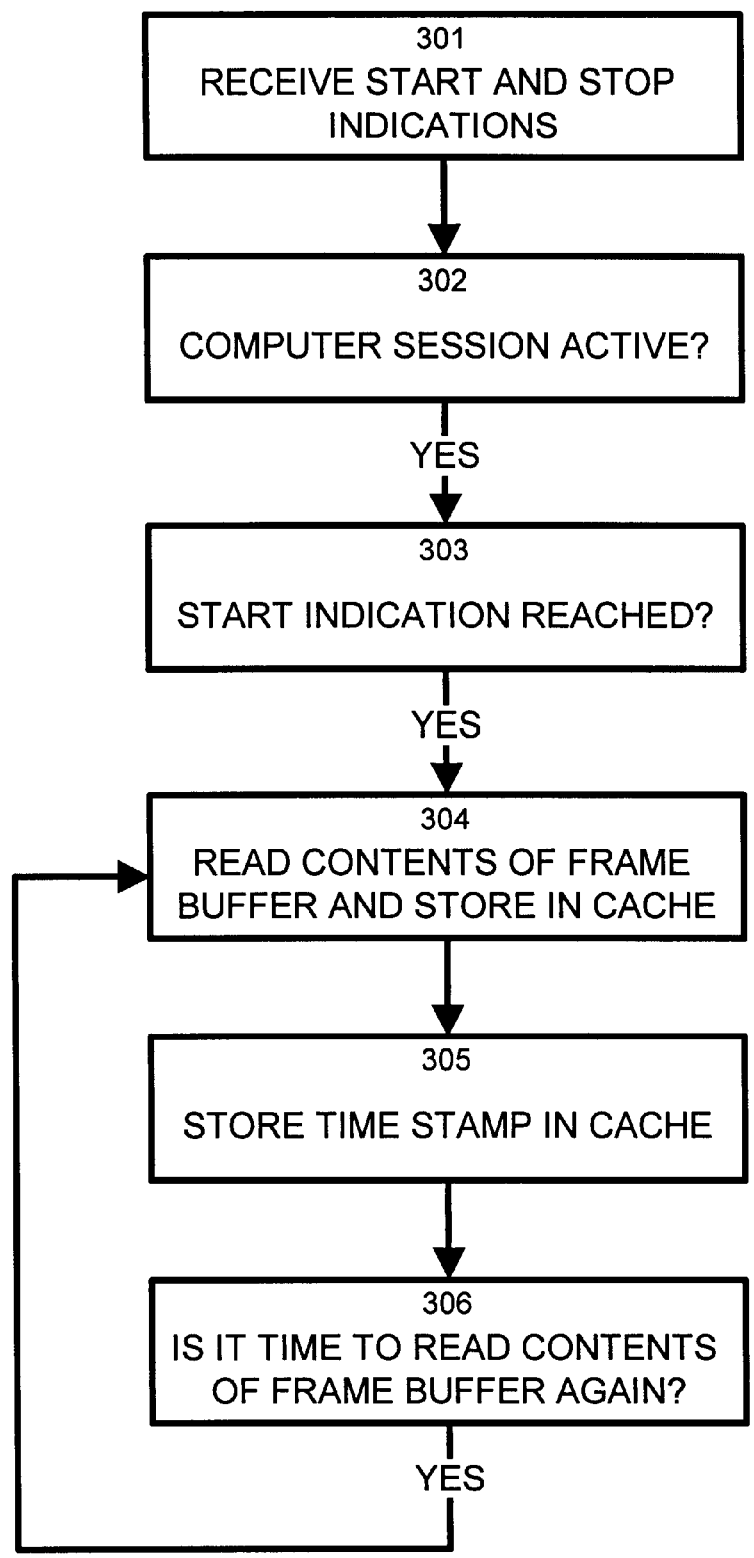
FIG. 3 illustrates a flow diagram of a method for automatically recording snapshots of a computer screen during a computer session for later playback, utilizing aspects of the present invention.

FIG. 3 illustrates a flow diagram of a method for automatically recording snapshots of a computer screen during a computer session for later playback. In 301, the controller 105 performs the step of receiving at least a start indication. In addition, it may also receive a stop indication and other recording control information. Preferably, the start and stop indications are start and stop times provided by a computer user while activating the software of the controller 105 to operate in a background mode, so that it is transparent to the computer user or any other user subsequently initiating a computer session on the computer. Alternatively, the start and stop indications may be interrupts resulting from programmed instructions relating to one or more items such as execution of a specific application program, entry of a specific user ID and password, or initiation of an internet session on the computer.

In 302, the controller 105 performs the step of determining whether a computer session is active, and in 303, the controller 105 performs the step of determining whether or not the start indication has been reached. When the start indication is a start time, the controller 105 performs this step by determining whether the current time is at least the start time. On the other hand, if the start indication is the start of a computer session, then the controller 105 determines in this step whether the computer session has started. Other start indications may be employed according to computer user input. If both 302 and 303 determinations are YES, then the controller 105 performs in 304–306 the step of automatically recording snapshots of a computer screen periodically after the start time during the computer session. The snapshots being recorded may be of the entire computer screen, or only a selected portion or window of the computer screen according to computer user input.

In 304, the controller 105 performs the step of copying contents of the frame buffer 103 into the FIFO cache memory 106. It does this by first reading the contents of the frame buffer 103, then storing the information thus read into a location of the FIFO cache memory 106 as determined by its write pointer. In 305, the controller 105 performs the step of also storing a time stamp in the FIFO cache memory 106. It does this by reading the time and date from clock information inside the computer, and storing such time stamp information along with its corresponding snapshot into the FIFO cache memory 106. Alternatively, the time stamp may be stored in a register of the controller 105 corresponding to the location of the FIFO cache memory 106 in which the corresponding snapshot is stored. In 306, the controller 105 then determines whether it is time to read the contents of the frame buffer again for the next snapshot. If the determination is YES, then the controller 105 jumps back to 304, and performs once again, the step of copying contents of the frame buffer 103 into the FIFO cache memory 106.

Figure 4:
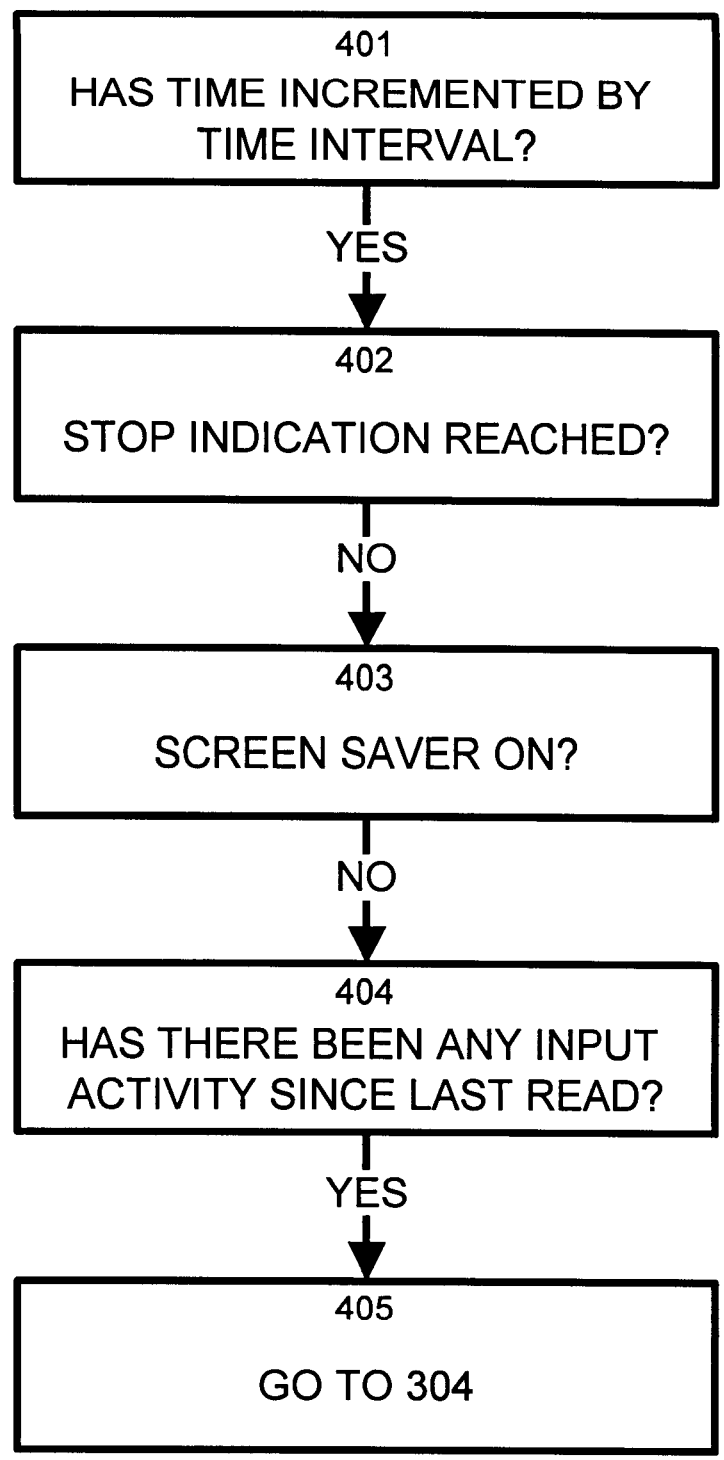
FIG. 4 illustrates a flow diagram of a method for determining whether it is time to read contents of the frame buffer again, which is useful for a method for automatically recording snapshots of a computer screen during a computer session for later playback.

A more detailed diagram of 306 is shown in FIG. 4. In 401, the controller 105 determines whether the time has incremented by a determined time interval. If the determination is YES, then in 402, the controller 105 determines whether a stop indication has been reached. When the stop indication is a stop time, the controller 105 determines in this step whether the current time is greater than the stop time. On the other hand, if the stop indication is the end of the computer session, then the controller 105 determines in this step whether the computer session has ended. Other stop indications may be employed according to computer user input. If the 402 determination is NO, then in 403, the controller 105 determines whether a screen saver is active or ON. If the 403 determination is also NO, then in 404, the controller 105 determines whether there has been any input activity since the last read from the frame buffer 103. Input activity, in this case, could take the form, for example, of keystroke input or mouse click input. Finally, if the determination resulting from 404 is YES, then the controller 105 jumps back to 304. The order in which 401–404 are performed by the controller 105 is not important, and is shown here in this order merely for illustrative purposes. Further, additions to and deletions from the determinations described with respect to 401–404 are also contemplated to be within the scope of the present invention.

Figure 5:
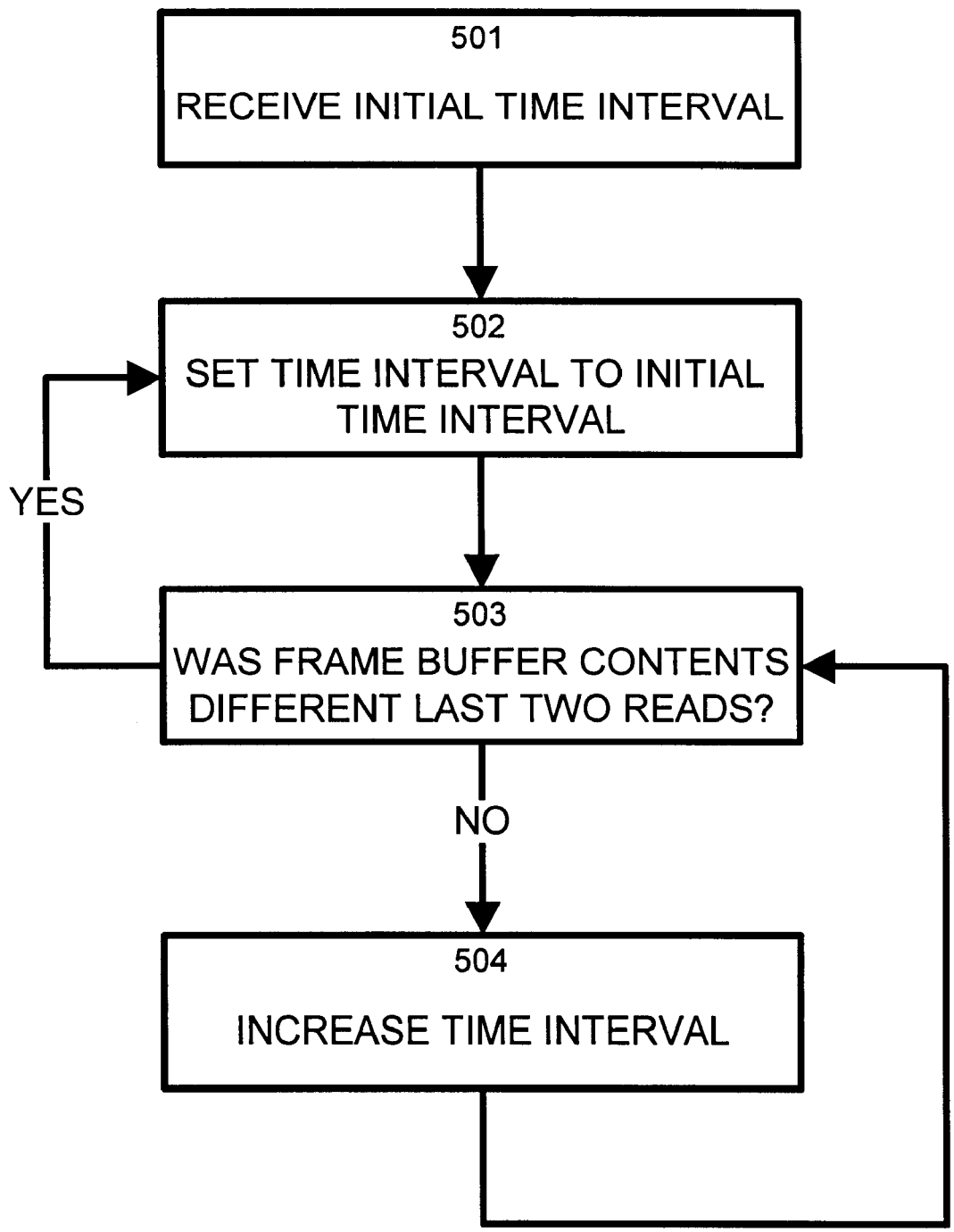
FIG. 5 illustrates a flow diagram of a method for modifying a time interval between successive readings of the contents of a frame buffer, which is useful for a method for automatically recording snapshots of a computer screen during a computer session for later playback.
Figure 6:
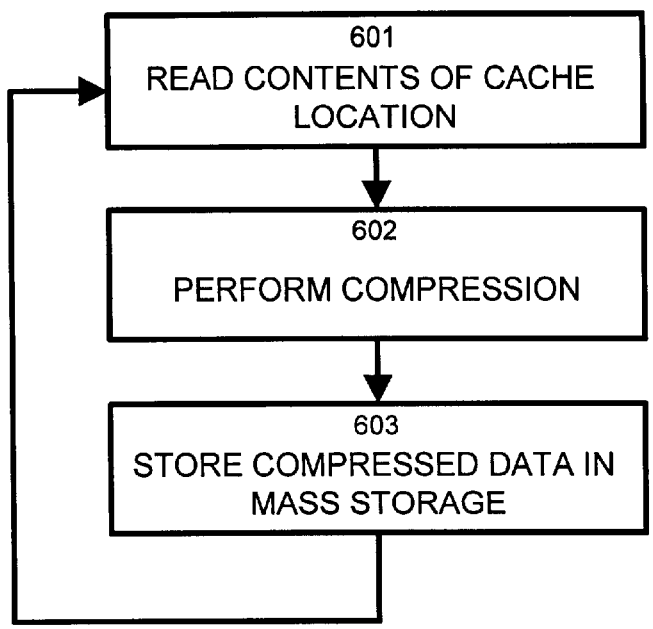
FIG. 6 illustrates a flow diagram of a method useful for reducing the required size of mass storage memory by compressing cache memory data before storing it in mass storage memory.
Figure 7:
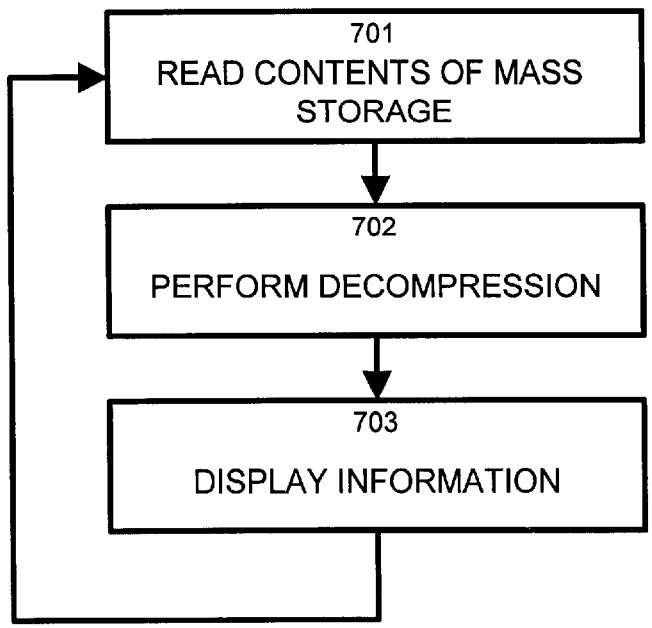
FIG. 7 illustrates a flow diagram of a method useful for reducing the required size of mass storage memory by decompressing compressed data read from mass storage memory.

The time interval between successive snapshots of the computer screen 101, and corresponding reads of the frame buffer 103, is determined in a manner as described in reference to FIG. 5. In 501, the controller 105 receives an initial time interval. Preferably, the initial time interval is provided along with start and stop times by a computer user while activating the software of the controller 105. Alternatively, it may be determined by preprogrammed instructions relating to one or more items such as execution of a specific application program, entry of a specific user ID and password, or initiation of an Internet session on the computer.

In 502, the controller 105 sets the time interval to the initial time interval. In 503–504, the controller 105 performs the step of adjusting the time interval between snapshots according to differences in the computer screen between successive snapshots. In particular, in 503, the controller 105 first determines differences between the contents read from the frame buffer 103 in the last two reads. The contents to be compared can be found in the last two written-to locations of the FIFO cache memory 106. The comparison may take the form of any of a number of conventional techniques such as calculating a correlation factor between the two locations. In this example, the controller 105 determines whether the contents read from the frame buffer 103 in the last two reads is different by comparing the calculated correlation against a minimum value. If the correlation is greater than the minimum value, then the computer screen has substantially changed and the determination results in a YES, resulting in the controller 105 jumping back to 502. On the other hand, if the correlation is less than the minimum value, the computer has not substantially changed and the determination results in a NO, resulting in the controller 105 next performing 504. In 504, the controller 105 performs the step of increasing the time interval by a predefined increment, then goes back to perform 503 after a next read from the frame buffer 103. In this manner, as long as the computer screen is changing significantly, the time interval between snapshots remains the initial time interval. On the other hand, if the computer screen is not changing in a significant manner between snapshots, then the time interval between snapshots is incrementally increased so as not to waste memory space by recording substantially redundant snapshots in memory.

Another technique used to minimize memory requirements is the compression of the data read from the frame buffer 103 before storing it in the mass storage memory 107 for recording, and its subsequent decompression after reading it from the mass storage memory 107 for playback. Compression is described in reference to FIG. 6, and decompression in reference to FIG. 7. In particular, during recording mode, in 601, the controller 105 performs the step of reading information indicative of the computer screen by reading the contents of a FIFO cache memory 106 location as pointed to by its read pointer; in 602, the controller 105 performs the step of compressing the information thus read by processing it through a compression algorithm; and in 603, the controller 105 performs the step of storing the compressed information in the mass storage memory 107, then goes back to 601 to compress the contents of the next location of the FIFO cache memory 106 as pointed to by the advancing read pointer. In playback mode, in 701, the controller 105 reads the contents of the mass storage memory 107 at locations where previously recorded snapshots are stored; in 702, the controller 105 decompresses the information thus read; and in 703, the controller 105 makes available the decompressed information so that the snapshots can be displayed for review.

Although the various aspects of the present invention have been described with respect to a preferred embodiment, it will be understood that the invention is entitled to full protection within the full scope of the appended claims.

We claim:

1. A method for automatically recording snapshots of a computer screen in a memory efficient manner during a computer session for later playback, comprising:

receiving a start indication; and automatically recording snapshots of a computer screen periodically at time intervals adjusted according to predefined rules for reducing memory storage requirements during a computer session after said start indication is reached, for retrieval and later playback upon command.

2. The method according to claim 1, wherein said start indication is a start time, and said automatically recording snapshots of a computer screen periodically at time intervals adjusted according to predefined rules for reducing memory storage requirements during a computer session after said start indication is reached, comprises automatically recording snapshots of a computer screen periodically during a computer session after said start time is reached.

3. The method according to claim 1, wherein one of said predefined rules comprises adjusting said time intervals between snapshots according to differences in the computer screen between successive snapshots.

4. The method according to claim 1, wherein one of said predefined rules comprises adjusting said time intervals between snapshots according to input activity between successive snapshots.

5. The method according to claim 1, wherein one of said predefined rules comprises suspending the recording of snapshots while a screen saver is active on the computer screen.

6. The method according to claim 1, wherein said automatically recording snapshots of a computer screen periodically at time intervals adjusted according to predefined rules for reducing memory storage requirements during a computer session after said start indication is reached, comprises:

reading information indicative of said computer screen;

compressing said information; and storing said compressed information in computer memory.

7. The method according to claim 1, wherein said automatically recording snapshots of a computer screen periodically at time intervals adjusted according to predefined rules for reducing memory storage requirements during a computer session after said start indication is reached, comprises automatically recording snapshots of a selected area of said computer screen periodically.

8. The method according to claim 1, wherein said automatically recording snapshots of a computer screen periodically at time intervals adjusted according to predefined rules for reducing memory storage requirements during a computer session after said start indication is reached, comprises automatically recording snapshots of a selected window of said computer screen periodically at time intervals adjusted according to predefined rules for reducing memory storage requirements.

9. The method according to claim 1, wherein said automatically recording snapshots of a computer screen periodically at time intervals adjusted according to predefined rules for reducing memory storage requirements during a computer session after said start indication is reached, comprises recording time stamps along with said snapshots.

10. The method according to claim 1, further comprising receiving a stop indication, and wherein said automatically recording snapshots of a computer screen periodically at time intervals adjusted according to predefined rules for reducing memory storage requirements during a computer session after said start indication is reached, comprises discontinuing the recording of snapshots after said stop indication is reached.

11. An apparatus for automatically recording snapshots of a computer screen in a memory efficient manner during a computer session for later playback, comprising:

a frame buffer for storing snapshots of the computer screen;

a memory; and programmed means for receiving a start indication and storing data in said memory derived from contents of said frame buffer periodically at time intervals adjusted according to predefined rules for reducing memory storage requirements during a computer session after said start indication is reached, for later retrieval and playback upon command.

12. The apparatus according to claim 11, wherein one of said predefined rules includes adjusting said time intervals between successive storing of data in said memory according to differences in the data being stored.

13. The apparatus according to claim 11, wherein said programmed means is further for deriving said data by processing said contents of said frame buffer through a compression algorithm.

14. The apparatus according to claim 11, wherein said memory is a mass storage memory, and further including a cache memory, wherein said programmed means is further for copying said contents of said frame buffer into said cache memory, deriving said data by processing said contents of said cache memory through a compression algorithm, and storing said derived data into said mass storage memory.

15. The apparatus according to claim 14, wherein said cache memory is a FIFO memory, and said programmed means is further for copying said contents of said frame buffer into a first location of said FIFO memory while substantially concurrently deriving said data by processing contents of a second location of said FIFO memory through a compression algorithm, wherein said second location contains contents of said frame buffer at a prior copying.

16. A computer system for automatically recording snapshots of a computer screen in a memory efficient manner during a computer session for later playback, comprising:

a frame buffer for storing snapshots of the computer screen;

a memory; and programmed means for receiving a start indication, storing data in said memory derived from contents of said frame buffer periodically at time intervals adjusted according to predefined rules for reducing memory storage requirements during a computer session after said start indication is reached, and retrieving said stored data from memory for playback upon command.

17. The computer system according to claim 16, wherein one of said predefined rules includes adjusting said time intervals between successive storing of data in said memory according to differences in the data being stored, and adjusting said time intervals between successive storing of data in said memory according to input activity between successive snapshots.

18. The computer system according to claim 16, wherein said programmed means is further for deriving said data by processing said contents of said frame buffer through a compression algorithm.

19. The computer system according to claim 18, said memory is a mass storage memory, and further including a cache memory, wherein said programmed means is further for copying said contents of said frame buffer into said cache memory, deriving said data by processing said contents of said cache memory through a compression algorithm, and storing said derived data into said mass storage memory.

20. The computer system according to claim 19, wherein said programmed means is further for retrieving data from said mass storage memory, processing said retrieved data through a decompression algorithm, and storing said processed data in said frame buffer for playback upon command.

* * * * *